Figure 1:
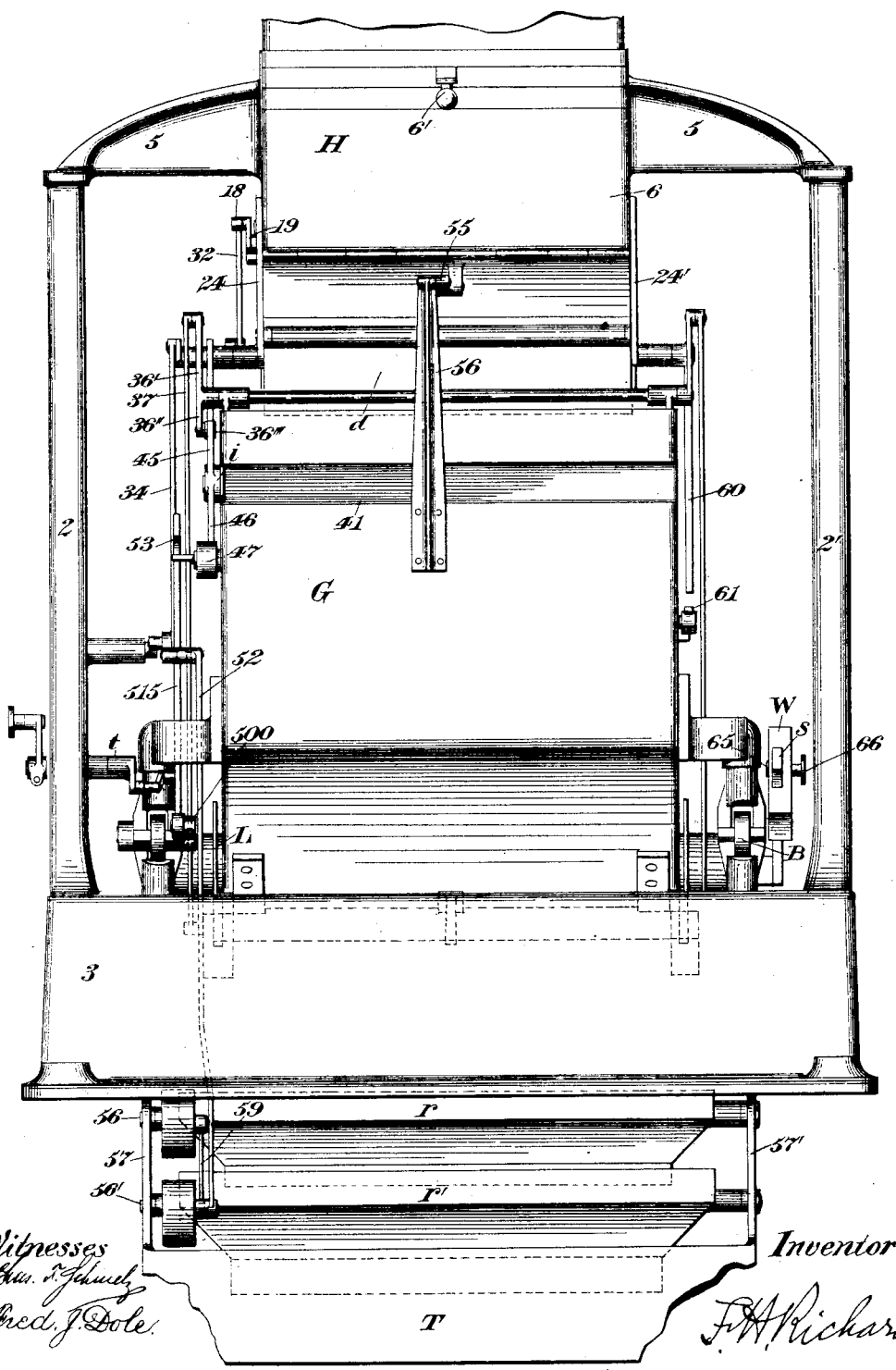

No. 607,482. Patented July 19, 1898.
F. H. RICHARDS.
WEIGHING MACHINE.
(Application filed Nov. 12, 1897.)

(No Model.) 6 Sheets—Sheet 1.

Witnesses
Inventor

No. 607,482. Patented July 19, 1898.
F. H. RICHARDS.
WEIGHING MACHINE.
(Application filed Nov. 12, 1897.)
(No Model.) 6 Sheets—Sheet 2.

Witnesses:
Chas. T. Schmelz
Fred. J. Dole.

Inventor:
F. H. Richards.

No. 607,482. Patented July 19, 1898.
F. H. RICHARDS.
WEIGHING MACHINE.
(Application filed Nov. 12, 1897.)

(No Model.) 6 Sheets—Sheet 3.

Witnesses
Chas F. Schmelz
Fred. J. Dole.

Inventor:
F.H. Richards.

No. 607,482. Patented July 19, 1898.
F. H. RICHARDS.
WEIGHING MACHINE.
(Application filed Nov. 12, 1897.)
(No Model.) 6 Sheets—Sheet 4.

Witnesses
Chas. F. Schmelz
Fred. J. Dole.

Inventor
F. H. Richards.

No. 607,482. Patented July 19, 1898.
F. H. RICHARDS.
WEIGHING MACHINE.
(Application filed Nov. 12, 1897.)
(No Model.) 6 Sheets—Sheet 5.

Witnesses
Chas. F. Schmelz
Fred. J. Dole.

Inventor
F.H.Richards.

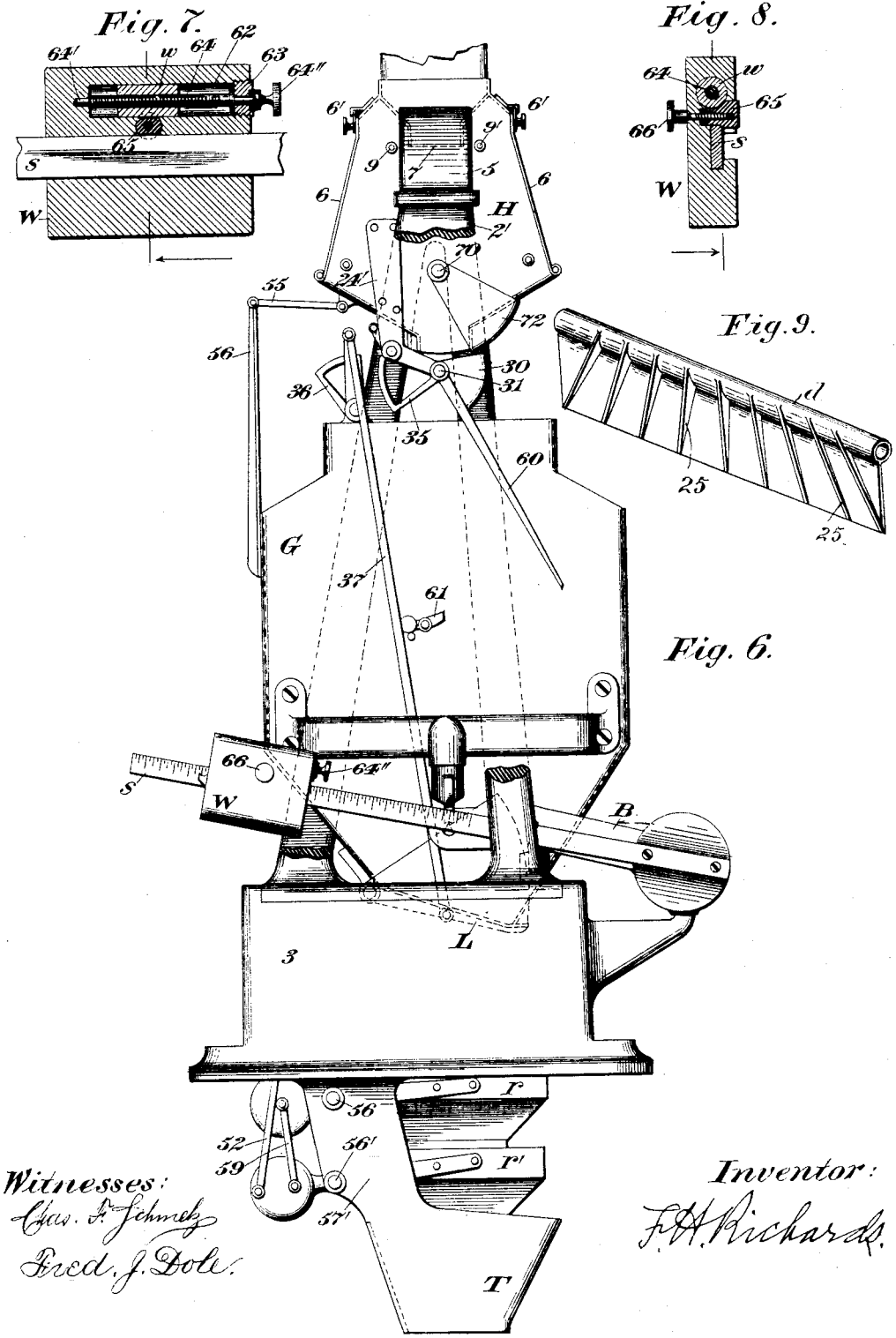

UNITED STATES PATENT OFFICE.

FRANCIS H. RICHARDS, OF HARTFORD, CONNECTICUT.

WEIGHING-MACHINE.

SPECIFICATION forming part of Letters Patent No. 607,482, dated July 19, 1898.

Application filed November 12, 1897. Serial No. 658,254. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, and especially to automatic weighing-machines of that class adapted for weighing predetermined quantities of granular or other material; and it has for its main objects the provision of improved stream-controlling means, improved regulator mechanism, novel holding devices for securing the shiftable member of the load-receiver in its closed or load-receiving position, improved connections between the load-receiver and its load-discharger for supporting the latter in its closed position, improved valve-operating connections controlled by the thrust of the beam mechanism, a new style of weight for determining what loads are to be weighed by the machine, and other features which will be referred to more particularly hereinafter.

One of the principal features of these improvements is the employment of means for reducing the size of the flow-stream by the engagement of a plurality of superposed members disposed either at one side or at opposite sides of the stream with the material in such a manner that the upper member or members will dip a short distance into the stream to partially reduce the width of the latter, while the lower member or members will dip farther and farther into the stream, according to the number of members used, and thus all of said members will coöperate to reduce gradually the volume of the stream as it issues from a suitable stream-supplying device or chute, each of these stream-reducing members serving to receive a portion of the force exerted by the material in its fall, the combined action of all these stream-reducing members effecting not only the reduction of the volume of the flow-stream, but also reducing to a very considerable extent the force of the falling stream before the material passes beyond the range of action of these members. Preferably two sets of these stream-reducing members will be employed, one set at each side of the flow-stream, the members of the two sets coöperating to reduce the volume of the flow-stream at both sides thereof from a full head to a drip-stream. All of the stream-reducing members or blades of each set will preferably be inclined at an acute angle to the path of the stream, and when two sets are used they will of course converge toward the delivery end of the stream-controlling devices. The members of each set may be disposed in parallelism with one another and mounted for simultaneous oscillation about an axis preferably outside the line of flow of the stream.

A feature of these improvements which I consider of special importance is the provision of means for spreading the stream delivered from a suitable source of supply, so that the material before it is delivered into a suitable receiver will be spread out and scattered to a very great extent relatively to the size of the stream as it issues from the supply device. This spreader may be of any suitable type and may be employed either alone or in connection with one or more other stream-controlling members or valves. In the preferred construction thereof this stream-directing spreader is in the nature of a valve, preferably substantially flat, having stream-directing members or ribs diverging from the receiving end of the valve, so that when the material is delivered onto the latter the stream will not continue in a straight line toward the delivery end of said valve, but will be spread out and will tend to flow thereover in diverging streams and be discharged therefrom as a substantially fan-shaped thin stream extending transversely of the mouth of the load-discharger for a distance considerably greater than the width of the receiving end of this stream-spreading valve. This spreading-valve is preferably so constructed as to have a relatively narrow receiving portion or end and a relatively wide discharging portion for the reasons just stated. In the construction illustrated herein the stream-spreader constitutes a drip-valve for spreading out the drip material into a wide thin stream, and this drip-valve should of course coöperate with one or more main valves during the flow of the main stream.

I prefer to make use of a main swinging valve in connection with the stream-reducing members hereinbefore referred to for reducing the volume of the flow-stream as the latter issues from a suitable chute or source of supply, and, moreover, I may dispose below the main valve a cut-off valve, preferably of the "swinging" type, so positioned that its cut-off face will move in an arc below the discharge end of the drip-valve and cut off the last portion of the drip-stream by a relatively rapid movement. The diverging ribs of the stream-spreading valve constitute not merely a means for causing the drip material to be delivered to the load-receiver in a wide thin sheet, but also a means for checking to a considerable extent the flow of the material over the drip-valve. Hence the spreader will hold a considerable quantity of material during the delivery of the last portion of the drip-stream to the receiver, and thus normally increase the amount of material which will be in the air between the main valve and the charge in the receiver at the time the final cut-off should take place. On this account it is necessary to cut off the drip-stream below the drip-valve and not, as heretofore usually done, immediately below or at the edge of the main valve.

In the several types of weighing-machines shown in prior patents granted to me a closer-latch or similar holding device has been employed usually for securing in position the load-discharger or member which is shiftable for discharging a load, and this holding device or latch has had usually a single stop-face or catch-face coöperating with another controlled by such load-discharger for maintaining the load-discharger or closer shut. In such a construction as this if the latch should fail to engage the other stop or catch on the shutting of the closer the latter would obviously rebound and might remain partly open during the weighing of a load, or at least during the early stages of the making up of the load in the receiver, and thus vitiate the accuracy of the weighing operation. In the construction illustrated in my present application, however, I have illustrated means for engaging the closer whether it has returned to the limit of its closing movement or is shut sufficiently to prevent the escape of material, but still is not at the limit of the range of its closing movement. The holding means which I employ for this purpose comprises a pair of shiftable holding members, one of which is operatively connected with the shiftable member or load-discharger of the weighing mechanism and the other of which may be supported in any suitable manner, one of these holding members having a single stop-face, while the other has a plurality of stop-faces, any one of which may be engaged by the single stop-face of the coöperative member, so that one holding member may engage the other in any one of a plurality of separate positions, relatively close together, however. Preferably the holding member which is connected with the shiftable member or load-discharger just referred to has a multiplied movement with respect to the load-discharger when the latter is shifted toward and is almost in its closed position. The manner in which this multiplied movement is obtained will be fully described hereinafter in detail.

The improved devices for supporting the load-discharger in its closed position on the load-receiver also constitute an important feature of these improvements. In machines of this class shown in my prior patents it has been customary to support the load-discharger by a toggle connected with the load-receiver and disposed substantially in its dead-center position when the load-discharger is shut. In such a construction as this of course practically all of the weight of the load in the receiver is carried by one of the pivots of the toggle, and very little of the force of the charge is exerted upon the latch or holding device by which the closer is usually secured in place. In the construction illustrated herein I have shown an improved type of connecting means for this purpose in which the essential feature of a toggle similar to that just described is retained; but in conjunction therewith I make use of another member or members, preferably in the form of an intermediate or lever, adapted to coöperate with the toggle and so disposed and organized with respect thereto as to reduce to a still greater extent the force applied to the holding device or latch by means of which the load-discharger is maintained shut. This intermediate or lever may advantageously be pivotally connected with the toggle by a slip-joint and will usually be in the form of a cam-lever having a cam-face against which a member of the toggle is adapted to bear, the parts being so disposed relatively to each other that when the load-discharger or closer is shut this toggle and the intermediate or lever will also be close to a dead-center position. Another important advantage which I secure by the use of this intermediate is the obtainment of a multiplied movement of the latter with respect to the movement of the closer, both when the latter closes and when it opens, and it will be clear that although the intermediate has such a multiplied movement the member of the toggle with which it coöperates need not have so great a movement, but that the latter may move through a smaller arc while the coöperating portion of the intermediate is moving through a greater one, which movement of the intermediate or lever may of course be multiplied many times relatively to the synchronous movement of the closer. Hence it will be apparent that this intermediate may advantageously constitute one of the holding members hereinbefore referred to and may have either a single stop-face or catch-face thereon or may have a plurality of stop-faces or teeth relatively close together, any one of which may be engaged by the coöperative holding member or latch.

In connection with holding devices of any suitable kind, but preferably such as those just described, for securing the load-discharger in its closed position I prefer to employ a latch-tripper operating in a novel manner in conjunction with suitable valve-actuating mechanism.

Ordinarily in the type of weighing-machine shown herein it has been customary to employ a valve-opening thrust member or thrust-rod pivoted to a stream-controlling valve and in operative relation with the beam mechanism, this thrust member being usually operated by a counterweighted lever or valve-opening actuator on such beam mechanism. In this case, however, while I have retained the general features of this valve-opening mechanism, the thrust member or thrust-rod which coöperates with the valve is not connected directly with the latter, but is pivoted between its ends and is operatively connected with the valve which it is intended to open. Near one end thereof this thrust member is disposed normally in operative relation with the beam mechanism, while near the other end thereof it coöperates with and preferably has secured thereto a latch-tripper by means of which the usual closer-latch or similar holding device may be released. One of the objects of constructing and mounting the thrust-rod in this manner, so that it forms practically a lever pivoted, preferably, substantially midway of its ends, is to enable the latch-tripper to be withdrawn out of the path of the latch when the thrust-rod is oscillated about its pivot, the movements of the parts being such that said latch-tripper will be withdrawn before the opposite end of the thrust-rod is moved out of engagement with the beam mechanism.

As before stated, the operating connections between the beam mechanism and the valve for opening the latter embody a thrust member preferably in the form of a pivoted lever, and in the construction illustrated herein this thrust member or lever is pivoted to connections between the valve and a suitable regulator, which latter coöperates with the load-discharger and in turn serves to prevent the premature opening of the valve. The connections between the regulator and this valve are preferably in the form of a linkage, to one of the members of which the thrust member or lever just alluded to is pivoted, so as to have not merely a swinging movement about its pivot but, also a shifting movement bodily, due to the shifting of the parts of the linkage. In order, however, to prevent undue shifting of this thrust member bodily, I prefer to connect thereto at the point at which said lever is pivoted to the linkage a guide-link secured in turn to any suitable fixed member of the supporting-framework.

The regulating mechanism which I make use of in this instance embodies a plurality of superposed regulator devices, preferably in the form of regulator-hoppers, disposed one within the other and connected in such a manner that they will have different ranges of movement, the connection being made, preferably, by means of a link or links pivotally connected with the regulators at different distances from the axes of movement thereof, the point of connection with the upper regulator being at a greater distance from the axis of movement of the latter than the point of connection of the link with the next lower regulator.

My present improvements also embody a new type of weight for determining the size of the load to be weighed by the machine, this weight being in this instance a composite one, comprising a main weight movable on some suitable scale-arm and a poise-weight movable relatively to the main weight and longitudinally of the scale-arm, the preferred construction being one in which the main weight has a guide, such as a longitudinal bore, in which the poise-weight will slide, this bore being closed, so as to form a dust-proof chamber and prevent interference with the proper adjustment of the poise-weight, which latter may be adjusted to any desired position, as by means of a screw on the main weight. In connection with the main weight and the poise-weight I also employ holding means common to the two and preferably in the form of a wedging device carried by the main weight and so positioned as to be capable of engaging one edge of the scale-arm and one side of the poise-weight to wedge these two parts together, and thus fasten the main weight to the scale-arm and the poise-weight to the main weight.

Figure 2:
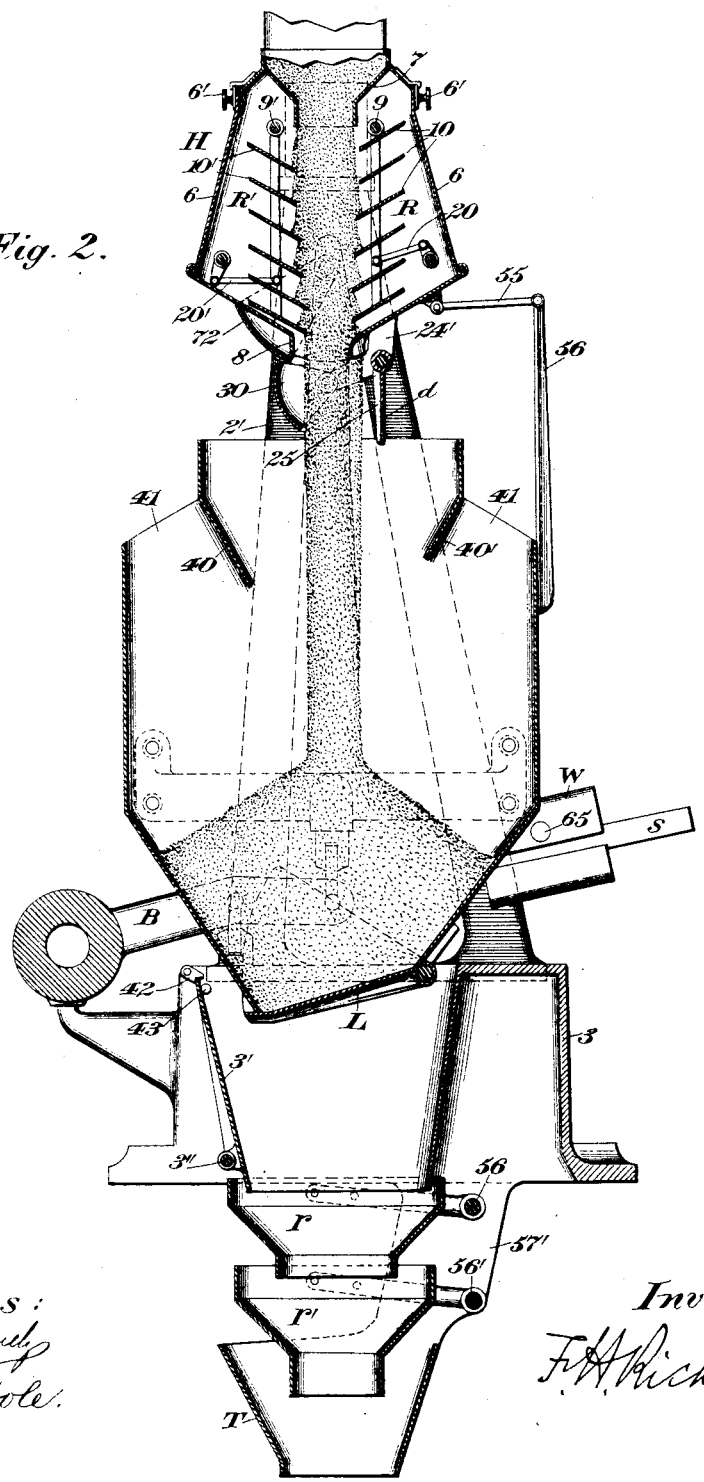
Figure 3:
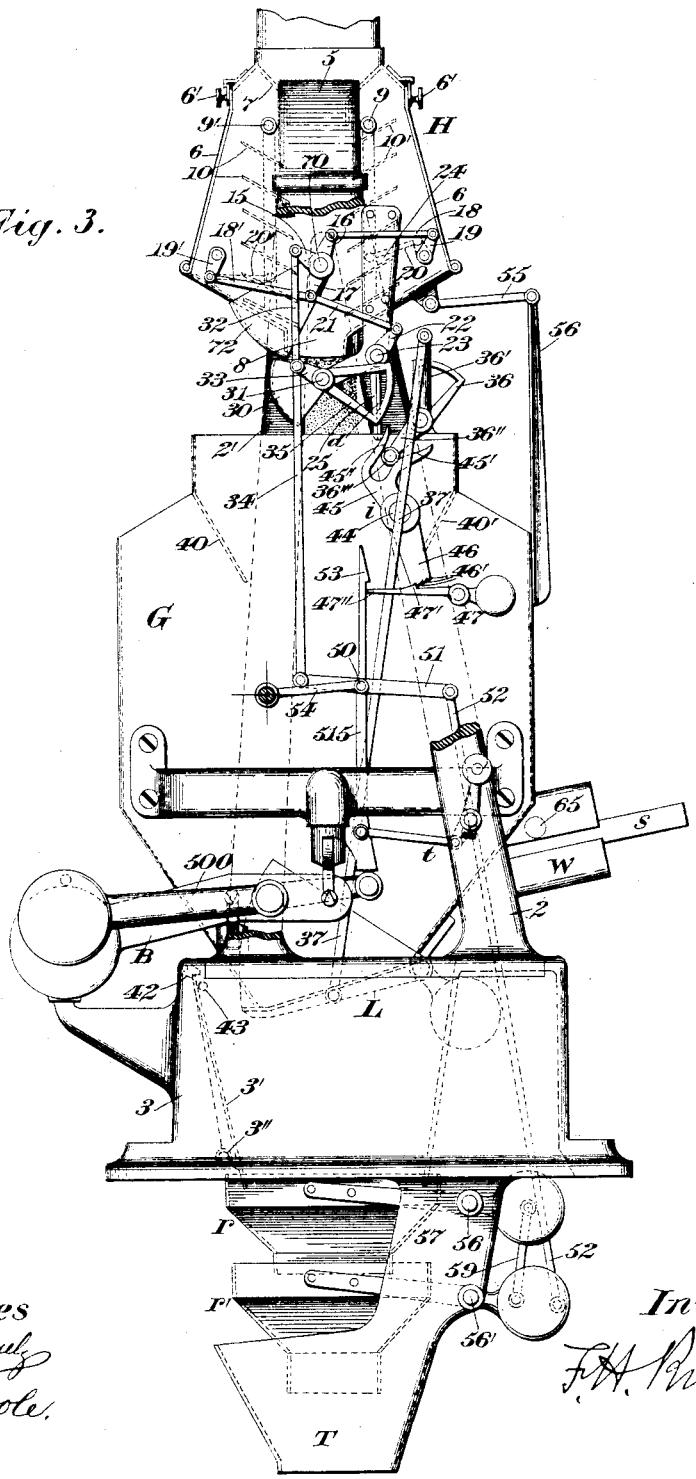
Figure 4:
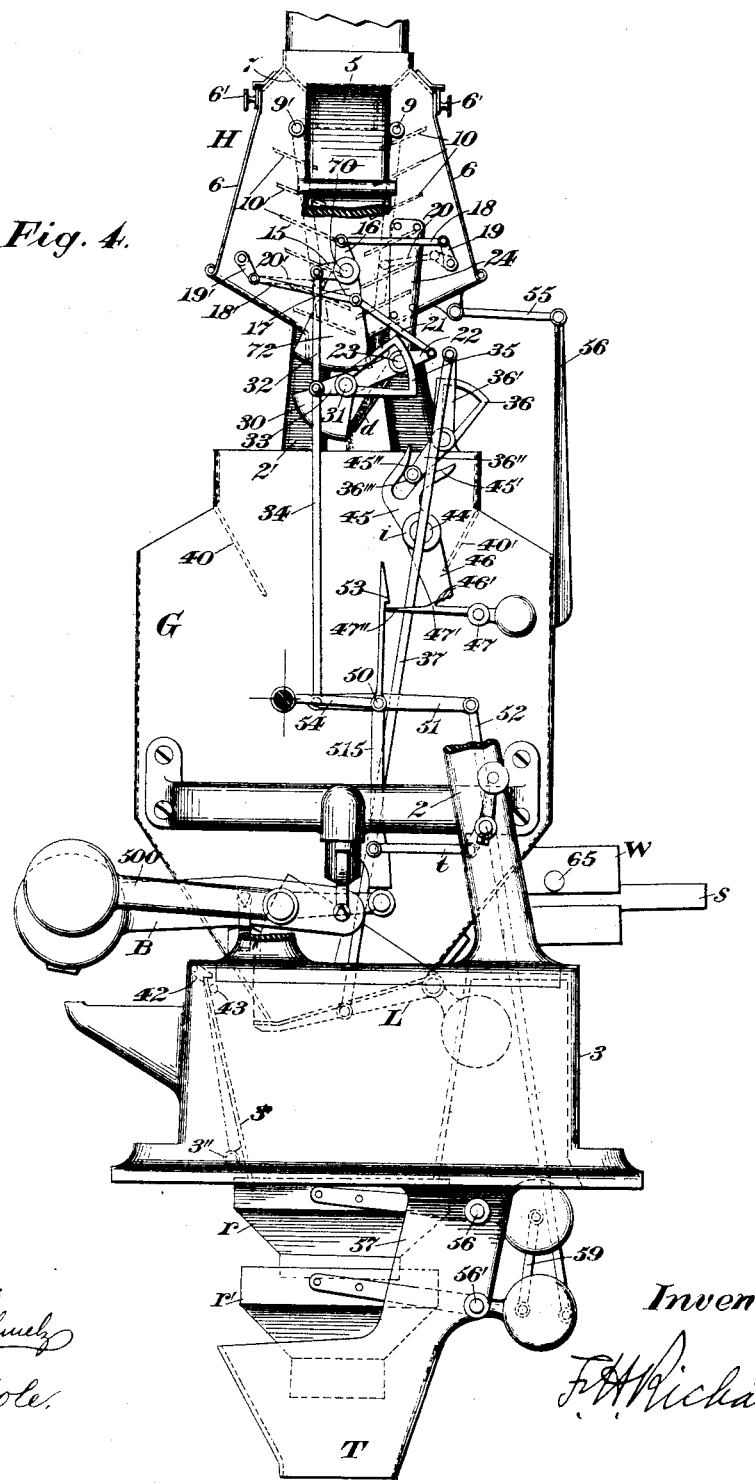
Figure 5:
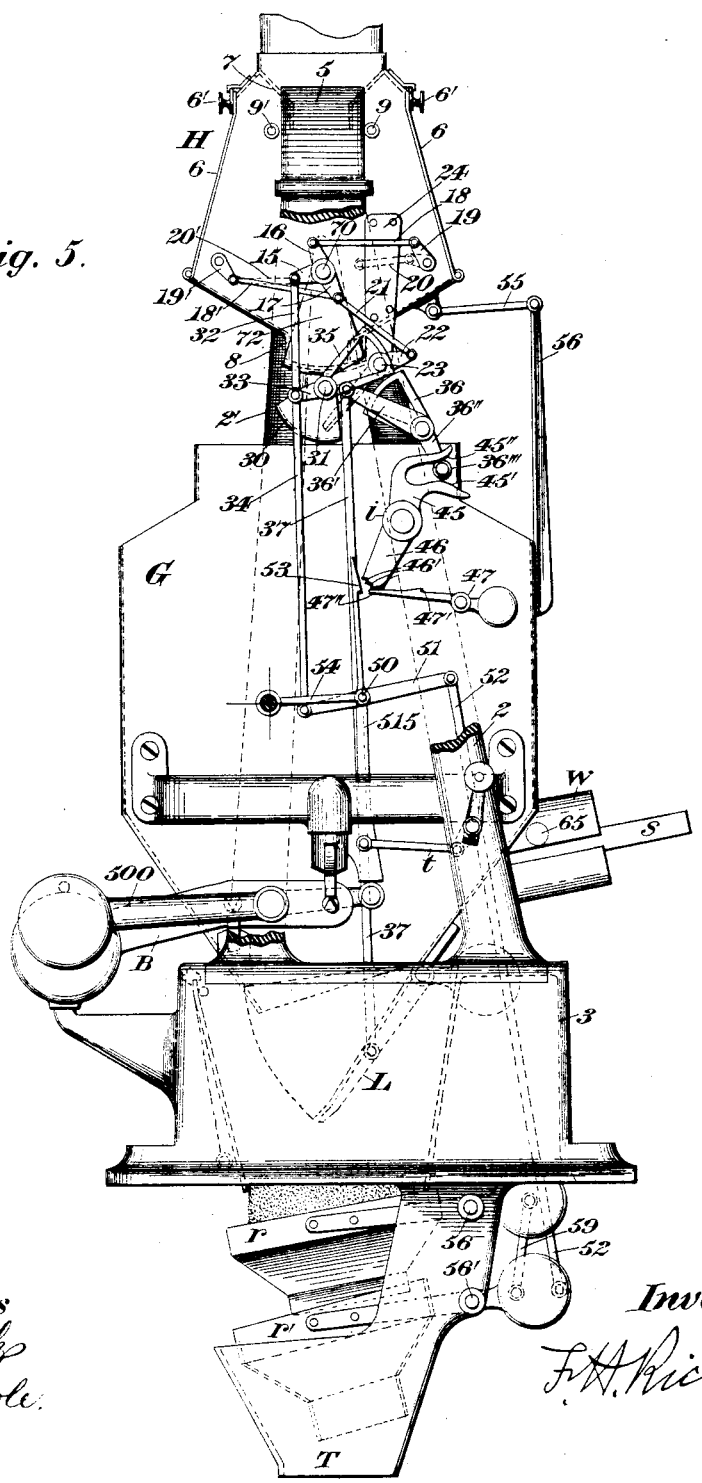

In the drawings accompanying and forming part of this specification, Figure 1 is a front elevation of an automatic weighing-machine embodying my present improvements. Fig. 2 is a central vertical section of the same, showing the parts in their normal positions for making up a load. Fig. 3 is a side elevation of the same with parts broken away and shows the parts in the same positions. Fig. 4 is a similar view showing the operation of the stream-controlling means for reducing the volume of the flow-stream to a drip-stream and for spreading the drip-stream delivered into the load-receiver. Fig. 5 is a similar view showing the positions of the parts on the discharge of a load. Fig. 6 is a side elevation of the machine with parts broken away, the view being taken looking from the opposite side to that shown in Figs. 3, 4, and 5. Fig. 7 is a detail illustrating in longitudinal section the construction of the main weight and the poise-weight and the holding means therefor. Fig. 8 is a transverse section of the same, and Fig. 9 is a detail illustrating in front elevation the stream-spreader or stream-spreading drip-valve.

Similar characters designate like parts in all the figures of the drawings.

Any suitable framework may be employed for supporting the several operative parts of my improved weighing-machine. In the construction illustrated herein I have shown a chambered base, such as 3, from which rise suitable side frames, such as 2 and 2', connected at their upper ends by a top plate or beam, such as 5, on which will be mounted stream-supplying means, which will usually be in the form of a hopper, such as H.

The hopper H may be of any suitable type; but it will preferably be a rather wide one, having a pair of swinging walls, such as 6 6, which may be fastened in place in any suitable manner, as by means of holding devices, such as 6' 6'. It will be noticed that the hopper illustrated has an upper discharge-spout, such as 7, and a lower discharge-spout, such as 8, at a considerable distance below the upper one for the purpose of providing a space in which the stream-reducing members hereinbefore referred to may operate. As before stated, I may make use of one or more of these stream-reducing devices, but preferably employ two of them working oppositely to each other and movable in unison. These two stream-reducing devices may be of any suitable construction so long as they operate in the manner hereinbefore described, but in this instance are disposed at opposite sides of the flow-stream and are carried within the hopper H and move about axes outside of the path of the stream. These stream-reducing devices are designated in a general way by R and R', and each embodies a plurality of superposed preferably parallel blades, which may be fixedly supported by a suitable swinging frame. The axes of oscillation of the two devices R and R' are indicated herein by 9 and 9', respectively. The particular construction of this swinging frame for each stream-reducing device is not essential; but the stream-reducing members, which are indicated herein by 10 and 10', will usually be disposed in two series, the members of each series being preferably flat blades inclined toward the path of the flow-stream, the blades of each series being parallel with each other and the blades of opposite sets converging toward each other and toward the discharge end of the stream-reducing devices.

In order that the volume of the main stream may be gradually reduced as the material passes between the two devices R and R', the stream-reducing members are preferably so disposed that they will dip successively farther and farther into the mass of material from the upper to the lower end of the stream-reducing means, and hence each stream-reducing member at each side of the main stream will not only reduce to a certain extent the volume of the flow-stream, but will also receive a certain portion of the force of the stream, due to the weight, impact, and momentum of the latter, and hence a considerable portion of this force will not only be taken up by the stream-reducing members, but will also be taken substantially equally by the latter. It will be clear, therefore, that when the flow-stream issues from the discharge ends of the two stream-reducing devices the material will be moving at a relatively slow speed and will also be reduced to a relatively narrow stream when the reducing devices are operated to shift their stream-reducing blades into the path of the material. In order to render the reducing action of these blades still more effective, I prefer to dispose them so that the blades of one set will alternate with those of the other—that is to say, each blade of one set will intersect the flow-stream at a point between two blades of the other set.

In connection with the reducing devices just described I may employ one or more coöperating stream-controlling members, one of which may be a main valve substantially of the type shown herein at 72 and having its axis of movement at 70, this valve being preferably supported by the hopper H.

The valve 72 carries for movement in unison therewith three rock-arms, such as those indicated herein at 15, 16, and 17, the former being connected, in a manner which will be described more fully hereinafter, with the valve-opening connections to the beam mechanism and the regulator, while the last two rock-arms may be connected in any suitable manner with the two stream-reducing devices R and R', so as to operate the latter simultaneously. In this instance links, such as 18 and 18', are connected, respectively, with the rock-arms 16 and 17 and with corresponding rock-arms 19 and 19', which in turn are connected with the stream-reducing devices, as by means of links, such as 20 and 20'. The manner in which these parts operate will be obvious by referring to the drawings. The rock-arm 17 is also connected in this instance by means of a link, such as 21, with a rock-arm, such as 22, movable in unison with the drip-valve, although of course these connections may be varied. This drip-valve is, as before stated, in the form of a spreader, the preferred construction of which is illustrated clearly in detail in Fig. 9.

The drip-valve is designated in a general way by d and may be supported for oscillation by a shaft 23, journaled in hangers, such as 24 and 24', secured to the sides of the hopper H. This drip-valve is preferably in the form of a flat swinging pan having a relatively narrow receiving portion or end and a relatively wide discharge end, and the valve also has a series of ribs, such as 25, diverging from the receiving toward the discharge end thereof, to carry the drip material forward not in a straight line or in parallel lines, but in paths diverging from one another to thereby scatter the drip-stream and deliver it into the load-receiver spread out in a very thin sheet, so that the fall of the different particles composing the drip-stream will be retarded very materially by the resistance of the air and to a very much greater extent than is the case when the drip-stream is delivered substantially in a solid stream into the receiver. I deem this feature one of very great importance, as by means of a suitable spreader the drip material may be so scattered that the force of the falling material due to the impact and momentum thereof may be very greatly reduced, and hence one of the chief load-vitiating factors almost completely eliminated.

By means of the connections between the main valve and the drip-valve $d$ the latter may be oscillated about its axis at the proper time, as will be obvious, to form not only a spreader for the drip-stream, but also a stream-directing chute, which will be disposed at such an angle that the movement of the drip material thereover will be very greatly retarded by the diverging ribs, and hence the material will fall over the discharge end of the spout with very little appreciable momentum. In connection with the stream-reducing means hereinbefore described for reducing the volume of the flow-stream this spreader constitutes a very perfect means for regulating the flow of the drip material.

For the purpose of cutting off the last part of the drip-stream I prefer to make use of a cut-off valve—such, for instance, as that illustrated herein at 30—this valve in the construction shown being oscillatory about an axis passing through trunnions, such as 31, mounted for oscillation near the extreme lower ends of the hangers 24 and 24'. The valve 30 is preferably connected, as by means of a link, such as 32, with the rock-arm 15, carried by the main valve, the link 32 being in this instance connected at its lower end with another rock-arm, such as 33, movable with the cut-off valve 30. To this rock-arm 33 the upper member of the valve-operating connections to the beam mechanism and the regulator will in this instance be connected, this upper member being in the present case a connecting-rod, such as 34. The cut-off valve 30 may also carry the usual interlocking stop-segment, such as 35, coöperative with a corresponding stop-segment, such as 36, mounted in the usual manner for oscillation on the load-receiver and operatively connected with the load-discharger or closer, as by means of a connecting-rod, such as 37.

Any suitable type of load-receiver may be employed for receiving the material delivered from the supply-hopper H, said receiver being designated in a general way by G and being mounted in a well-known manner on knife-edge bearings at the poising side of beam mechanism, preferably of the "single-beam" type, which beam mechanism is designated herein by B, and in turn may be supported by knife-edge bearings on the base 3 of the machine. The beam mechanism may also carry a valve-opening actuator or counter-weighted lever, such as 500, of the usual type, the pivot of this lever being between the points of support of the bucket and the beam mechanism, respectively. The load-receiver in this instance has an upper material-receiving portion of moderate diameter, with converging walls, such as 40 40, and a lower portion of considerably larger diameter for containing the major portion of the load. Between these two portions of the load-receiver are openings, such as 41, through which any masses of foreign material which may be in the charge may be removed.

The load-receiver of course embodies a member shiftable for discharging the load, this shiftable member being in the present case in the form of a load-discharger or closer of well-known construction mounted for oscillation at the discharge end of the load-receiver and designated herein in a general way by L.

The chambered base 3 of the framework, through which base a discharged load is usually delivered to suitable regulating apparatus, has in this instance a swinging or oscillatory wall, such as 3', supported for movement about an axis, (indicated herein at 3".) This swinging wall is intended, of course, to aid in supporting the discharged loads as they are delivered from the receiver and may be held in place in any suitable way, as by means of a simple catch, such as 42, the inward movement of this swinging wall being limited, as by means of a stop 43. This swinging wall is of importance as a means for enabling an attendant to get at the inner walls of the chambered base, and especially the inner side of the closer, when the latter is opened to clean off material therefrom when the parts become coated and the proper operation of the machine impaired. Such a swinging wall is especially necessary when the material being weighed is cotton-seed meal or other material of an extremely oily or sticky nature liable to adhere to the working parts and cake in the pivots of the mechanism. By using this wall 3' it will be seen that when the latter is lowered its inner face also may be cleared of any accumulation of material thereon, and all of the lower parts of the base and the bucket and the closer may be easily gotten at for cleaning or repairs.

As hereinbefore stated, the load-receiver and the load-discharger are intended to be connected by a toggle in substantially the manner shown and described in prior patents granted to me, this toggle being disposed substantially on its dead-center line when the closer is shut. One member of this toggle is the connecting-rod 37, hereinbefore referred to, and the other member is in this instance the arm 36' of the rocker or interlocking stop-segment 36, this toggle-arm 36' forming one arm of a lever of which the other arm is indicated herein by 36". With this arm 36" the intermediate, which I have referred to before, is intended to coöperate, and this intermediate is in the present case in the form of a lever (indicated herein in a general way by $i$) mounted for oscillation on a stud 44, which may be on the side of the load-receiver G below the pivot of the rocker or stop-segment 36. This lever $i$ has two arms, one of which is indicated herein by 45 and the other by 46. The arm 45 is intended to have a loose connection with the arm 36" of the rocker, and in this instance a slip-joint connects the two, the lever-arm 45 being bifurcated and having two cam-faces 45' and 45", which coact with the arm 36" of the rocker and preferably with an antifriction-roll, such as 36''', thereon.

It will be noticed that the cam-faces 45' and 45" are so shaped and that the arms 36" and 45 are so disposed relatively to the pivots of the rocker 36 and the intermediate that when the closer is shut said rocker and the intermediate are also close to the dead-center position thereof, and hence serve as an additional means for preventing the transmission of the force exerted by the load in the receiver to the holding means or latch, which secures the closer in its shut position. Moreover, it will be noticed that both the arms 36" and 45 have multiplied movements relatively to the opening and final closing movements of the load-discharger and that the arm 45 has a considerably greater multiplied movement than has the arm 36".

The intermediate or lever will usually constitute, as hereinbefore stated, the coacting holding member, by means of which the load-discharger or closer is held or latched shut, and in this case the arm 46 of the intermediate has at its outer end a plurality or series of stop-faces or teeth, such as 46', coöperative with a coacting stop face or detent 47' of the coacting holding member or latch, which may be of any suitable construction and is indicated herein at 47, it being preferably counterweighted.

It will be clear that the arm 46 has a mulplied movement relatively to the last portion of the closing movement of the load-discharger and that if the last one of the series is not caught by the detent 47' the bucket will not rebound and remain open, but said detent 47' will engage one of the other faces of said series of stop-faces.

The valve-operating thrust member or thrust-rod, by means of which the force of the valve-opening actuator or counterweighted lever 500 is transmitted to the stream-controlling means or valve mechanism, is not connected in the present instance directly to a stream-controlling valve, but is pivotally carried by suitable coacting connections, through which its thrust will be transmitted to such valve. In this case the thrust member or thrust-rod which I prefer to employ is indicated herein at 515 and is in the nature of a lever pivoted at 50 to one of the operating connections to which reference has just been made. In this instance these connections are controlled also by the action of the regulating apparatus and are in the nature of a linkage embodying three members, one of which is the connecting-rod 34, hereinbefore mentioned, the other two being a link, such as 51, and a connecting-rod, such as 52, pivoted to the regulating apparatus. To the link 51 of this linkage the thrust-rod or lever 515 is pivoted, (in this case at a point between its ends,) the lower end of said lever coöperating with the counterweighted lever 500, while the upper end thereof may carry the latch-tripper, one form of which is indicated herein at 53 and is constructed as a part of said thrust-rod or lever. As the lever 515 is pivoted to the link 51, said lever will of course be capable not only of oscillation about the center 50, but said center itself may be shifted also by the linkage, and the lever moved bodily from one position to another. In the construction illustrated if the lever is oscillated about its center, even to a very slight extent, the latch-tripper 53 will be thrown out of operative relation with the coacting end 47" of the latch 47, although the lower end of said lever or thrust-rod need not necessarily be shifted out of operative relation with the inner end of the counterweighted lever 500. For the purpose of preventing undue movement of the lever or thrust-rod 515 and for guiding the latter in its movements I prefer to connect thereto, at the pivotal point thereof, a guide-link, such as 54, which may be secured to any suitable fixed part of the framework. It should be noted here that the bucket or load-receiver G may also be guided, as is usual, by means of a link, such as 55, secured to a projecting arm, such as 56, on the receiver.

I may make use of the usual connections with the valve-operating thrust-rod or lever 515 for the purpose of shifting the same sidewise out of operative relation with the inner end of the counterweighted lever 500 for the purpose of testing the operation of the machine, these connections being designated herein in a general way by $t$. As their construction and operation are well understood, these testing connections will not be described in detail. It will be clear, however, that when the thrust-rod 515 is oscillated about its pivot by means of the testing devices $t$ the latch-tripper 53 will be thrown out of operative relation with the latch before the lower end of the thrust-rod is disengaged from the valve-opening actuator and that by the time such lower end of the thrust-rod is disengaged from the lever 500 the latch-tripper 53 will be at a relatively great distance from the latch.

The regulating apparatus which I employ in the present instance comprises a plurality of regulators preferably in the form of members disposed one within the other, and in this case they are two in number, the two regulating members being indicated herein by $r$ and $r'$. These two members may be mounted for oscillation on pivots, such as 56 and 56', carried by hangers, such as 57 and 57', depending from the main base 3 and having at their lower ends a discharge hopper or trough, such as T. As before stated, these regulator-hoppers will be so connected that the lower one will have a greater range of movement than the upper, and this is effected in the present case by connecting to the respective hoppers a link, such as 59, which is pivotally connected with the upper hopper at a greater distance from the pivot 56 thereof than its point of connection with the lower hopper is from the axis of the latter. The two hoppers are of course counterweighted, and the connecting-rod 52 will be pivotally connected with the lower hopper $r'$.

In connection with the valve mechanism hereinbefore described I may make use of the usual pointer or drip-lever, such as 60, which in this instance will be carried by and movable with the cut-off valve 30 and will be engaged and released at the proper time by a suitable stop, such as 61, on the opposite side of the load-receiver from that on which the principal devices just described are carried. (See Fig. 6.) In this latter view I have also illustrated on the same side of the machine with the pointer 60 and the by-pass stop therefor a scale-arm movable in unison with and secured to the beam mechanism B. This scale-arm is indicated herein by $s$ and is of the usual type, having weight indications marked thereon. On this scale-arm may be mounted a shiftable weight, which may be secured thereto at any desired point in a manner well understood, for the purpose of determining the exact amount to be made up by the machine. The weight which I employ in this case is, however, of a different type from those shown in patents heretofore granted to me, it being composite—that is to say, it is made up of a main weight, such, for example, as that shown at W, (see Figs. 6, 7, and 8,) and a supplementary or poise weight, one form of which is indicated herein at $w$. The main weight is, as before stated, slidable along the scale-arm $s$; but the poise-weight is carried by the main weight and is movable relatively thereto longitudinally of the scale-arm, so as to obviate the necessity of having to shift the relatively large mass W a relatively short distance, as is usually done in obtaining a fine adjustment of the weight on the scale-arm. Instead of so adjusting the main weight the poise-weight $w$ is intended to be shifted to different points longitudinally of the main weight, it being guided thereon in some suitable manner—as, for instance, in a longitudinal bore, such as 62, in the main weight. This bore may be closed at its open end in any suitable manner, as by means of cap 63, so as to form a dust-proof chamber and prevent interference with the proper adjustment of the poise-weight. Said poise-weight may be of any suitable construction, but will preferably have a longitudinally-screw-threaded bore in which may work an adjusting feed-screw, such as 64, which in this instance is passed through the cap 63 and is held against longitudinal movement with respect thereto by suitable stop members, said feed-screw being supported at its extreme inner end at 64' in a suitable recess in the main weight, this feed-screw preferably having a milled head, such as 64", by means of which the screw may be turned to shift the poise-weight $w$ longitudinally in the bore. It will be clear that by means of this poise-weight a very fine balance of the poising and counterpoising mechanisms of the weighing-machine may be obtained.

For the purpose of securing the main weight and poise-weight in their adjusted positions I prefer to make use of fastening or clamping means common to the two weights. In this instance the fastening or clamping device is carried by the main weight and is in the form of a wedging device operative for securing the main weight to the scale-arm and the poise-weight to the main weight. In the construction illustrated a wedging fastening device, such as that illustrated herein at 65, works between the poise-weight $w$ and one edge of the scale-arm, the main weight having a transverse opening therein intersecting the bore 62 for this purpose, as will be clear by referring to Figs. 7 and 8, and this weight 65 has two wedge-faces adapted to engage, respectively, with the periphery of the poise-weight and with one edge of the scale-arm, so as to force these two members apart, and thereby wedge the poise-weight against the main weight and by reaction secure the main weight to the scale-arm. For the purpose of operating this wedge 65 I may employ a threaded adjusting member or clamp-screw, such as that shown at 66. It will be seen that by simply turning the clamping-screw both weights may be fastened firmly in position and that it is not necessary to secure the two parts in place by separate fastening devices.

The operation of an automatic weighing-machine constructed in accordance with my present improvements, as illustrated in the construction shown in the drawings of this application, is as follows: It being understood that all of the parts are in their normal positions for the making up of a new load, with the stream-reducing devices in the positions shown in Figs. 2 and 3, the valves wide open, the load-discharger or closer shut and latched in its closed position, the main and poise weights properly adjusted, and the regulating apparatus in its non-regulating position, it will be seen that material will flow through the spout 7 between the two stream-reducing devices R and R' and may be slightly reduced, if desired, by the latter, but will flow in a substantially full stream into the load-receiver until the latter begins to descend, whereupon as the poising side of the beam mechanism descends the thrust-rod 515 will descend also and will permit the load-reducing devices to move toward each other and the valves 72, $d$, and 30 to close partially until the drip-lever 60 strikes the stop 61, when the members will be in the drip position shown in Fig. 4. At this time the stream flowing between the load-reducing devices R and R' will be reduced to a relatively small stream, gradually diminished in volume from the upper to the lower end of the reducing devices, and this relatively small flow-stream will be delivered onto the drip-valve $d$, and the latter will spread the material by means of its diverging ribs and cause it to be delivered into the load-receiver in a very thin sheet having but little momentum. As soon as the load-receiver descends below the poising-line the pointer 60 will be released by the stop 61, and immediately thereafter the cut-off valve will close quickly, and the main valve 30 will be shifted somewhat also. The interlocking stops 35 and 36 will coöperate in the usual manner, and as soon as the load-receiver is overpoised the latch-tripper 53 will strike the end 47'' of the latch 47 and will release the latter from engagement with the cam-lever or intermediate $i$, whereupon the force of the material in the bucket, operating through the toggle and the intermediate, will cause the antifriction-roll 36''' to ride over the cam-face 45' to permit the closer to open. As soon as the discharged load reaches the regulating apparatus the two regulators $r$ and $r'$ will be shifted to the positions shown in Fig. 5 and will be held there until substantially all of the material shall have passed through the discharge-hopper T, when the regulators will rise. The closer of course is closed again and latched shut as soon as the load-receiver rises, and when the regulators return to their normal positions and the connections to the valve-opening thrust-rod and the valve are shifted from the positions shown in Fig. 5 to those illustrated in Fig. 3 the several valves will be opened and all of the parts will be in position for the making up of a new load.

Having described my invention, I claim—

1. In a weighing-machine, the combination, with stream-supplying means, of oscillatory stream-reducing means movable about an axis outside the flow-stream and embodying a plurality of superposed stream-reducing members simultaneously movable transversely to the path of the flow-stream, and having their forward edges in position to intersect successively the flow-stream, and means for actuating said stream-reducing means into the path of said stream in a direction transverse to the flow of the latter to reduce at all points simultaneously the flow of the stream from end to end of the path controlled by the stream-reducing means.

2. In a weighing-machine, the combination, with stream-supplying means, of two series of superposed stream-reducing members disposed at opposite sides of, and movable transversely to, the path of the flow-stream, the members of each set converging toward those of the other and toward the lower end of the flow-stream, and means for actuating said stream-reducing members into the path of said stream to reduce the volume of the latter.

3. In a weighing-machine, the combination, with stream-supplying means, of two series of superposed stream-reducing members disposed at opposite sides of, and movable transversely to, the path of the flow-stream, and forming between them a path of gradually-decreasing width, the members of each set converging toward those of the other and toward the lower end of the flow-stream; and means for actuating said stream-reducing members into the path of said stream to reduce the volume of the latter.

4. In a weighing-machine, the combination, with stream-supplying means, of two oppositely-operative series of simultaneously-operative superposed stream-reducing members disposed at opposite sides of, and movable transversely to, the path of the flow-stream, the members of each set converging toward those of the other and toward the lower end of the flow-stream; and means for actuating said stream-reducing members into the path of said stream to reduce the volume of the latter.

5. In a weighing-machine, the combination, with stream-supplying means, of a pair of stream-reducing devices oscillatory about axes at opposite sides of the path of the flow-stream, and each embodying a series of superposed stream-reducing members movable transversely to said path, the members of one series converging toward those of the other and toward the lower end of the flow-stream; and means for simultaneously actuating said stream-reducing devices into the path of said stream to reduce the volume of the latter.

6. In a weighing-machine, the combination, with stream-supplying means and with a load-receiver, of an oscillatory stream-reducing device controlled by the descent of the load-receiver and embodying a series of superposed stream-reducing members simultaneously movable transversely to the path of the flow-stream, and having their forward edges in position to intersect successively the flow-stream when shifted toward the latter.

7. In weighing mechanism, the combination, with stream-supplying means, of stream-controlling means embodying a main valve, a stream-spreading drip-valve for spreading the stream flowing thereover, and a cut-off valve having a cut-off face movable under the discharge end of the drip-valve.

8. In weighing mechanism, the combination, with stream-supplying means, of a plurality of superposed stream-reducing members movable transversely to the path of the flow-stream; means for actuating said stream-reducing members into the path of said stream to reduce the volume of the latter; and a stream-directing spreader below the stream-reducing members for spreading the stream delivered thereonto.

9. In weighing mechanism, the combination, with stream-supplying means, of a plurality of superposed stream-reducing members movable transversely to the path of the flow-stream; means for actuating said stream-reducing members into the path of said stream to reduce the volume of the latter; a main valve below the stream-reducing means and controlling the flow of the stream; and a stream-spreading drip-valve below the stream-reducing members and coöperative with the main valve.

10. In a weighing-machine, the combination, with a load-receiver and with a load-discharger, of a toggle connecting said load-receiver and the load-discharger; an intermediate operatively connected with said toggle and having a multiplied movement on, and relatively to, the opening movement of the load-discharger; and holding means for engaging said intermediate.

11. In a weighing-machine, the combination, with a load-receiver and with a load-discharger, of a toggle connecting said load-receiver and the load-discharger; an intermediate operatively connected with said toggle and having a multiplied movement on, and relatively to, the opening movement of the load-discharger; and a latch for engaging said intermediate.

12. In a weighing-machine, the combination, with a load-receiver and with a load-discharger, of a toggle connecting said load-receiver and the load-discharger; an intermediate connected with said toggle by a slip-joint and having a multiplied movement on, and relatively to, the opening movement of the load-discharger; and holding means for engaging said intermediate.

13. In a weighing-machine, the combination, with a load-receiver and with a load-discharger, of a toggle connecting said load-receiver and the load-discharger; an intermediate having a cam-face in operative relation with the toggle, and having a multiplied movement on, and relatively to, the opening movement of the load-discharger; and holding means for engaging said intermediate.

14. In a weighing-machine, the combination, with a load-receiver and with a load-discharger, of a toggle connecting said load-receiver and the load-discharger and disposed substantially on its dead-center line when the load-discharger is closed; a pivoted intermediate operatively connected with said toggle and also disposed close to a dead-center position when the load-discharger is closed, said intermediate having a multiplied movement on, and relatively to, the opening movement of the load-discharger; and holding means for engaging said intermediate.

15. In a weighing-machine, the combination, with a load-receiver and with a load-discharger, of a toggle connecting said load-receiver and the load-discharger; a lever operatively connected near one of its ends with said toggle, and having a multiplied movement on, and relatively to, the opening movement of the load-discharger; and holding means for engaging said lever near its opposite end.

16. In a weighing-machine, the combination, with a load-receiver and with a load-discharger, of a toggle connecting said load-receiver and the load-discharger; a lever having a cam-face near one of its ends in operative relation with said toggle, and having a multiplied movement on, and relatively to, the opening movement of the load-discharger; and holding means for engaging said lever near its opposite end.

17. In a weighing-machine, the combination, with a load-receiver and with a load-discharger, of a toggle connecting said load-receiver and the load-discharger; an intermediate operatively connected with said toggle and having a toothed holding-face; and a latch for engaging any one of the teeth of said intermediate on the closing of the load-discharger.

18. In a weighing-machine, the combination, with a load-receiver and with a load-discharger, of a toggle connecting said load-receiver and the load-discharger; a shiftable holding member operatively connected with said toggle and having a multiplied movement on, and relatively to, the opening movement of the load-discharger; and a coöperative holding member, one of said holding members having a plurality of stop-faces any one of which is adapted to be engaged selectively by a stop-face on the other holding member on the closing of the load-discharger to hold the load-discharger in any one of several closed positions.

19. In a weighing-machine, the combination, with a load-receiver and with a load-discharger, of a toggle connecting said load-receiver and the load-discharger; a lever having a cam-face near one of its ends in operative relation with said toggle, and having a multiplied movement on, and relatively to, the opening movement of the load-discharger, and also having at its opposite end a toothed stop-face; and a latch for engaging any one of the teeth of said stop-face on the closing of the load-discharger.

20. In a weighing-machine, the combination, with stream-supplying means and with a stream-controlling valve, of beam mechanism; a load-receiver embodying a member shiftable for discharging a load; a latch for said shiftable member; a valve-opening thrust-rod pivoted between its ends and coöperative at one side of its pivot with the beam mechanism; and a latch-tripper coöperative with said thrust-rod at the opposite side of the pivot of the latter.

21. In a weighing-machine, the combination, with stream-supplying means and with a stream-controlling valve, of beam mechanism; a load-receiver embodying a member shiftable for discharging a load; a latch for said shiftable member; a valve-opening thrust-rod pivoted between its ends and coöperative near its lower end with the beam mechanism; a latch-tripper carried by the upper end of said thrust-rod; and means for shifting the lower end of the thrust-rod out of operative relation with the beam mechanism.

22. In a weighing-machine, the combination, with stream-supplying means and with a stream-controlling valve, of beam mechanism; a regulator; connecting means between the regulator and the valve; and a valve-opening thrust member pivoted to said connecting means and in operative relation with the beam mechanism.

23. In a weighing-machine, the combination, with stream-supplying means and with a stream-controlling valve, of beam mechanism; a regulator; a linkage connecting said regulator and the valve; and a valve-opening thrust member pivoted to one member of said linkage and in operative relation with the beam mechanism.

24. In a weighing-machine, the combination, with framework, of stream-supplying means; a stream-controlling valve; beam mechanism; a regulator; a linkage connecting said regulator and the valve; a valve-opening thrust member pivoted to one member of said linkage and in operative relation with the beam mechanism; and a guide-link connected with the framework and pivoted to the thrust member at the point of connection of the latter with the linkage.

25. In a weighing-machine, the combination, with stream-supplying means and with a stream-controlling valve, of beam mechanism; a load-receiver embodying a member shiftable for discharging a load; a latch for said shiftable member; operating connections between the valve and the beam mechanism and embodying a lever pivoted between its ends and coöperative near one of its ends with the beam mechanism; and a latch-tripper coöperative with said lever at the opposite side of the pivot of the latter.

26. In a weighing-machine, the combination, with stream-supplying means and with a stream-controlling valve, of beam mechanism; a load-receiver embodying a member shiftable for discharging a load; a latch for said shiftable member; operating connections between the valve and the beam mechanism and embodying a lever pivoted between its ends, and coöperative near one of its ends with the beam mechanism; and a latch-tripper coöperative with said lever at the opposite side of the latter, and shiftable out of operative relation with the latch while the beam-operated end of the lever is in operative relation with the beam mechanism.

27. In a weighing-machine, the combination, with stream-supplying means and with a stream-controlling valve, of beam mechanism; a load-receiver; a load-discharger; a regulator below the load-discharger; and framework embodying a chambered base between the load-discharger and the regulator, said base having an oscillatory stream-supporting wall.

28. In a weighing-machine, the combination, with weighing mechanism, of regulating apparatus embodying a plurality of superposed counterpoised oscillatory regulators movable in arcs of different lengths; and connecting means between such regulators for modifying the movements thereof.

29. In a weighing-machine, the combination, with weighing mechanism, of regulating apparatus embodying a plurality of superposed counterpoised oscillatory regulators having different ranges of movement; and connecting means pivoted to said regulators at different distances from the axes of oscillation thereof.

30. In a weighing-machine, the combination, with weighing mechanism, of regulating apparatus embodying a pair of counterweighted oscillatory regulator-hoppers disposed one above the other and one within the other; and a link pivotally connected with said hoppers at a greater distance from the axis of oscillation of the upper, than from the axis of the lower, hopper.

31. In weighing mechanism, the combination, with beam mechanism embodying a scale-arm, of a main weight carried by, and movable longitudinally of, said scale-arm and having a longitudinal bore open at its outer end; a threaded cap for closing the open end of said bore; a poise-weight slidable in said bore; and a feed-screw carried by said cap and connected with the poise-weight for adjusting the latter.

32. In weighing mechanism, the combination, with a scale-arm, of a main weight carried by, and movable longitudinally of, said scale-arm; a poise-weight carried by the main weight and movable relatively thereto; and common fastening means for securing the main weight to the scale-arm and the poise-weight to the main weight.

33. In weighing mechanism, the combination, with a scale-arm, of a main weight carried by, and movable longitudinally of, said scale-arm; a poise-weight carried by the main weight and movable relatively thereto; and a wedging fastening device common to the main weight and the poise-weight for securing the main weight to the scale-arm and the poise-weight to the main weight.

34. In weighing mechanism, the combination, with a scale-arm, of a main weight carried by, and movable longitudinally of, said scale-arm; a poise-weight carried by the main weight and movable relatively thereto; and a fastening device carried by the main weight, and common to the main weight and the poise-weight, and operative for securing the main weight to the scale-arm and the poise-weight to the main weight.

35. In weighing mechanism, the combination, with a scale-arm, of a main weight carried by, and movable longitudinally of, said scale-arm and having a longitudinal guide; a poise-weight carried by said guide and movable longitudinally thereof; and a wedging fastening device carried by the main weight and working between, and adapted to bind against, the scale-arm and the poise-weight, to clamp the main weight to the scale-arm and the poise-weight to the main weight.

36. In weighing mechanism, the combination, with a scale-arm, of a main weight carried by, and movable longitudinally of, said scale-arm and having a longitudinal guide; a poise-weight carried by said guide and movable longitudinally thereof; and a wedging fastening device carried by the main weight and working between, and adapted to bind against, the scale-arm and the poise-weight, to clamp the main weight to the scale-arm and the poise-weight to the main weight; and a threaded adjusting member for operating said fastening device.

FRANCIS H. RICHARDS.

Witnesses:
F. N. CHASE,
JOHN O. SEIFERT.